US012389951B2

(12) United States Patent
Bilat et al.

(10) Patent No.: US 12,389,951 B2
(45) Date of Patent: Aug. 19, 2025

(54) AEROSOL-GENERATING SYSTEM AND HAPTIC OUTPUT ELEMENT FOR AN AEROSOL-GENERATING SYSTEM

(71) Applicant: Philip Morris Products S.A., Neuchatel (CH)

(72) Inventors: Stephane Bilat, Neuchatel (CH); Gregory Andre Cristian, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 681 days.

(21) Appl. No.: 17/611,709

(22) PCT Filed: May 12, 2020

(86) PCT No.: PCT/EP2020/063211

§ 371 (c)(1),
(2) Date: Nov. 16, 2021

(87) PCT Pub. No.: WO2020/234053

PCT Pub. Date: Nov. 26, 2020

(65) Prior Publication Data

US 2022/0232900 A1 Jul. 28, 2022

(30) Foreign Application Priority Data

May 17, 2019 (EP) .................................... 19175234

(51) Int. Cl.
*A24F 40/60* (2020.01)
*A24F 40/10* (2020.01)
(Continued)

(52) U.S. Cl.
CPC .............. *A24F 40/60* (2020.01); *A24F 40/51* (2020.01); *G08B 6/00* (2013.01); *A24F 40/10* (2020.01); *A24F 40/20* (2020.01)

(58) Field of Classification Search
None
See application file for complete search history.

(56) References Cited

U.S. PATENT DOCUMENTS

2010/0188327 A1 7/2010 Frid et al.
2013/0088438 A1 4/2013 Shih et al.
(Continued)

FOREIGN PATENT DOCUMENTS

CN 104010685 A 8/2014
CN 105473014 A 4/2016
(Continued)

OTHER PUBLICATIONS

Combined Russian Office Action and Search Report issued Sep. 6, 2023 in Russian Application 2021135736, (with English translation), 13 pages.
(Continued)

*Primary Examiner* — Linda L Gray
(74) *Attorney, Agent, or Firm* — Oblon, McClelland, Maier & Neustadt, L.L.P.

(57) ABSTRACT

An aerosol-generating device is provided, including: a housing including an air inlet, an air outlet, and an airflow passage extending therebetween; an aerosol-generating element disposed within the airflow passage and configured to generate an aerosol; a sensor coupled to the housing and configured to generate a time-dependent airflow signal corresponding to a time-dependent strength of a user puff at the air outlet; a haptic output element coupled to the housing; and a circuit operably coupled to the sensor so as to receive the time-dependent airflow signal during the user puff, and further configured to actuate, based on the time-dependent airflow signal, the haptic output element at time-dependent frequencies or at time-dependent intervals during the user puff. An aerosol-generating system, and a method for gen-
(Continued)

erating an output in an aerosol-generating device, are also provided.

12 Claims, 6 Drawing Sheets

(51) Int. Cl.

| | |
|---|---|
| ***A24F 40/20*** | (2020.01) |
| ***A24F 40/51*** | (2020.01) |
| ***G08B 6/00*** | (2006.01) |

(56) References Cited

U.S. PATENT DOCUMENTS

| | | | | |
|---|---|---|---|---|
| 2015/0020825 A1* | 1/2015 | Galloway | G08B 6/00 | 340/407.1 |
| 2016/0081393 A1* | 3/2016 | Black | H04L 67/10 | 392/404 |
| 2016/0338407 A1* | 11/2016 | Kerdemelidis | A24F 40/60 | |
| 2017/0215477 A1 | 8/2017 | Reevell | | |
| 2017/0238617 A1 | 8/2017 | Scatterday | | |
| 2018/0020729 A1 | 1/2018 | Alarcon et al. | | |
| 2018/0296777 A1* | 10/2018 | Terry | A61M 11/042 | |
| 2020/0000143 A1* | 1/2020 | Anderson | G06F 18/22 | |
| 2020/0150857 A1* | 5/2020 | Birnbaum | G01F 13/00 | |

FOREIGN PATENT DOCUMENTS

| | | | |
|---|---|---|---|
| CN | 106455722 | A | 2/2017 |
| CN | 109375775 | A | 2/2019 |
| JP | 2016-152808 | A | 8/2016 |
| JP | 2016-525348 | A | 8/2016 |
| JP | 2017-531337 | A | 10/2017 |
| JP | 2018-504926 | A | 2/2018 |
| JP | 3220829 | U | 4/2019 |
| KR | 10-2016-0052607 | A | 5/2016 |
| RU | 2665449 | C2 | 8/2018 |
| WO | WO 2013/093469 | A2 | 6/2013 |
| WO | WO 2013/137084 | A1 | 9/2013 |
| WO | WO 2015/009838 | A2 | 1/2015 |
| WO | WO 2017/205692 | A1 | 11/2017 |
| WO | WO 2018/190586 | A2 | 10/2018 |
| WO | WO 2019/173923 | A1 | 9/2019 |
| WO | WO 2020/008028 | A1 | 1/2020 |

OTHER PUBLICATIONS

International Search Report and Written Opinion issued on Aug. 4, 2020 in PCT/EP2020/063211 filed May 12, 2020, 12 pages.

Combined Taiwanese Office Action and Search Report issued Oct. 12, 2023 in Taiwanese Patent Application No. 109114316 (with English Translation), 26 pages.

Extended European Search Report issued Dec. 9, 2019 in corresponding European Patent Application No. 19175234.4, 9 pages.

International Preliminary Report on Patentability and Written Opinion issued May 3, 2021 in PCT/EP2020/063211, 10 pages.

Japanese Office Action issued Jun. 18, 2024 in Japanese Patent Application No. 2021-562098 (with unedited computer-generated English Translation), 5 pages.

Chinese Office Action and Search Report issued Feb. 9, 2025 in corresponding Chinese Patent Application No. 202080030547.X, with English Translation, 19 pages, therein.

* cited by examiner

AEROSOL-GENERATING SYSTEM AND HAPTIC OUTPUT ELEMENT FOR AN AEROSOL-GENERATING SYSTEM

The present invention relates to an aerosol-generating system, to a device for use with the system, and to a method of generating an aerosol. In particular, the invention relates to handheld aerosol-generating systems and devices which vaporise an aerosol-forming substrate by heating to generate an aerosol to be puffed or inhaled by a user, and which include an interface element.

One type of aerosol-generating system is an electrically heated smoking system that generates an aerosol for a user to puff or inhale. Electrically heated smoking systems come in various forms. Some types of electrically heated smoking systems are e-cigarettes that vaporise a liquid or gel substrate to form an aerosol, or release an aerosol from a solid substrate by heating it to a certain temperature below the combustion temperature of the solid substrate.

Handheld electrically operated aerosol-generating devices and systems are known that consist of a device portion comprising a battery and control electronics, a portion for containing or receiving an aerosol-forming substrate and an electrically operated heater for heating the aerosol-forming substrate to generate an aerosol. A mouthpiece portion is also included on which a user may puff to draw aerosol into their mouth.

Some devices and systems use a liquid or gel aerosol-forming substrate stored in a storage portion. Such devices can use a wick to carry the liquid or gel aerosol-forming substrate from the storage portion to the heater where it is aerosolised. Such devices can use a displacement meaning such as a pump and a piston to displace the liquid or gel-forming substrate from the storage portion to the heater. Other types of aerosol-generating devices and systems use a solid aerosol-forming substrate that includes a tobacco material. Such devices may comprise a recess for receiving a cigarette-shaped rod comprising the solid aerosol-forming substrate, such as folded sheets that include a tobacco material. A blade-shaped heater arranged in the recess is inserted into the centre of the rod as the rod is received in the recess. The heater is configured to heat the aerosol-forming substrate to generate an aerosol without substantially combusting the aerosol-forming substrate.

Electrically heated smoking systems can provide a significantly different user experience than a conventional, combustion-based cigarette. For example, the user interacts with a device rather than lighting a cigarette. Depending on the particular electrically heated smoking system, certain feedback may be provided to the user responsive to activation or use of the device, such as a vibration signal, an auditory signal, or a light signal. However, a signal may convey limited information, may be confusing, or may disturb the user or others. This can result in a diminished experience for the user.

An objective of the present invention is to provide the user with easily understandable feedback that conveys meaningful information, while preferably minimizing or reducing disturbance to others. For example, some configurations of the present invention can enhance feedback to users by providing an interface in an aerosol-generating system, such as a system including an aerosol-generating device that includes a haptic output element. The haptic output element is configured to convey information to a user via the user's sense of touch. The haptic output element can be coupled to any suitable component or components of the aerosol-generating system with which the user may interact during use of the system, for example, coupled to the aerosol-generating device. The information provided to the user via the haptic output element can provide the user with feedback regarding the time-dependent strength of a user puff. Preferably, such information is provided to the user by varying the frequency or interval of the haptic output element, rather than by varying the intensity of the haptic output element. As such, disturbance of others can be reduced or minimized, for example because the intensity of actuation of the haptic output element need not necessarily be increased (which might be heard by others) to provide the user with information about his or her puff strength. Additionally, or alternatively, the user's experience may be made more pleasant for example because the intensity of the haptic output element need not necessarily be increased (which might be uncomfortable for the user) to provide the user with information about his or her puff strength. However, even in configurations in which the intensity of the haptic output element is changed, e.g., increased, to provide the user with information about his or her puff strength, variation of the frequency or interval of the haptic output element may be used to provide the user with additional information about his or her puff strength. Thus, user experience and device management can be improved.

According to a first embodiment of the invention, there is provided an aerosol-generating device. The aerosol-generating device includes a housing comprising an air inlet, an air outlet, and an airflow passage extending therebetween. The aerosol-generating device includes an aerosol-generating element disposed within the airflow passage and configured to generate an aerosol. The aerosol-generating device includes a sensor coupled to the housing and configured to generate a time dependent airflow signal corresponding to a time dependent strength of a user puff at the air outlet. The aerosol-generating device includes a haptic output element coupled to the housing. The aerosol-generating device includes a circuit operably coupled to the sensor so as to receive the time dependent airflow signal during the user puff. The circuit further is operably coupled to the haptic output element and configured to actuate, based on the time dependent airflow signal, the haptic output element at time dependent frequencies or at time dependent intervals during the user puff.

In some configurations, the circuit optionally is configured to actuate the haptic output element at a constant intensity during the user puff.

Additionally, or alternatively, the circuit optionally further is configured to calculate, based on the time dependent airflow signal, a speed of airflow through the airflow passage during the user puff. For example, the circuit optionally is configured to actuate the haptic output element based on the calculated speed of airflow through the airflow passage during the user puff.

Additionally, or alternatively, optionally the circuit is configured to actuate the haptic output element at shorter intervals or at higher frequencies during the user puff based upon an increase in the time dependent airflow signal.

Additionally, or alternatively, optionally the circuit is configured to actuate the haptic output element at longer intervals or at lower frequencies during the user puff based upon a decrease in the time dependent airflow signal.

Additionally, or alternatively, optionally the haptic output element comprises a mechanical actuator or a piezoelectric actuator. Illustratively, the mechanical actuator optionally comprises a linear resonant actuator or an eccentric rotating mass actuator.

Additionally, or alternatively, optionally the airflow sensor comprises a pressure sensor.

Additionally, or alternatively, optionally the haptic output element is located such that the user's lips can sense actuation of the haptic output element.

Additionally, or alternatively, optionally the haptic output element is located such that one or more of the user's fingers can sense actuation of the haptic output element.

Additionally, or alternatively, optionally the device further comprises an interface configured to allow the user to select a haptic feedback profile.

Additionally, or alternatively, optionally the aerosol-generating element comprises a heater.

An aerosol-generating system can comprise an aerosol-generating device such as provided herein, and an aerosol-generating substrate, wherein the aerosol-generating substrate comprises nicotine.

As used herein, the term 'aerosol-generating system' relates to a system that interacts with one or more other elements. One such element with which an 'aerosol-generating system' can interact is an aerosol-forming substrate (e.g., provided within an aerosol-generating article) to generate an aerosol.

As used herein, the term 'aerosol-generating article' relates to an article comprising an aerosol-forming substrate. Optionally, the aerosol-generating article also comprises one or more further components, such as a reservoir, carrier material, wrapper, etc. An aerosol-generating article may generate an aerosol that is directly inhalable into a user's lungs through the user's mouth. An aerosol-generating article may be disposable. An aerosol-generating article comprising an aerosol-forming substrate comprising tobacco may be referred to as a tobacco stick.

As used herein, the term 'aerosol-forming substrate' relates to a substrate capable of releasing one or more volatile compounds that can form an aerosol. Such volatile compounds are released by heating the aerosol-forming substrate to form a vapour. The vapour can condense to form an aerosol, for example a suspension of fine solid particles or liquid droplets in a gas such as air. An aerosol-forming substrate may conveniently be part of an aerosol-generating device or system. In some configurations, the aerosol-forming substrate comprises a gel or liquid, while in other configurations, the aerosol-forming substrate comprises a solid. The aerosol-forming substrate may comprise both liquid and solid components.

As used herein, the term 'coupled' relates to an arrangement of elements that can be directly or indirectly in contact with one another. Elements that are 'directly' coupled to one another touch one another. Elements that are 'indirectly' coupled to one another do not directly touch one another, but are attached to one another via one or more intermediate elements. Depending on the particular arrangement, elements that are part of the same device or system as one another may be 'directly' in contact with one another or 'indirectly' in contact with one another.

As used herein, the term 'interface' relates to an element through which information can be transmitted, through which information can be received, or through which information can be both transmitted and received. An exemplary interface provided herein includes a haptic output element for transmitting information.

As used herein, the term 'haptic output element' relates to an element configured to convey information to a user via the user's sense of touch. For example, the haptic output element is configured such that when such element is actuated, a user can feel and recognize such actuation via the user's sense of touch. Typically, the user can feel the actuation of the haptic output element via his or her sense of touch at a defined portion of the device or system that the user is touching, for example using his or her finger, palm, or lip. Such defined portion of the device or system at which the actuation is felt can be or include, for example, a defined outer (peripheral) portion of the housing of the device of system, or the haptic output element, or any other suitable element of the interface, device, or system that is coupled to the haptic output element. The haptic output element may be actuated in such a manner as to convey information to the user via such actuation. Haptic output elements may be configured so as to convey information to the user by, for example, a vibration, a tap, a force, a temperature change (such as a heat pulse or a cold pulse), or an electrical signal. Haptic output elements can include, but are not limited to, mechanical actuators, piezoelectric actuators, electrical actuators, and thermal output elements.

As used herein, the term 'thermal output element' relates to an element that provides information to a user by generating a user-perceptible temperature change.

As used herein, the term 'user-perceptible temperature change' relates to a change of temperature that can be felt and recognized by a user. Typically, the user can feel the user-perceptible change of temperature via his or her sense of touch at a defined portion of the device or system that the user is touching, for example using his or her finger, palm, or lip. The portion of the device or system at which the user-perceptible temperature change is generated can initially be at a first temperature, such as ambient (room) temperature, or warmer than ambient temperature, for example because of heat transferred to such element by the aerosol-generating element or because of heat transferred from the user's skin, e.g., finger or lip. Actuation of the thermal output element causes the temperature at the defined portion of the device or system to increase or decrease to a second temperature that is perceptibly different from the first temperature.

The aerosol-generating system or device can include a gel, liquid, or solid aerosol-forming substrate, and can include a suitably configured aerosol-generating element configured as to generate an aerosol therefrom.

In configurations in which the aerosol-forming substrate comprises a gel or liquid, the aerosol-generating system or device can include a reservoir holding the aerosol-forming substrate, which reservoir optionally may contain a carrier material for holding the aerosol-forming substrate. The carrier material optionally may be or include a foam, a sponge, or a collection of fibres. The carrier material optionally may be formed from a polymer or co-polymer. In one embodiment, the carrier material is or includes a spun polymer.

In some configurations, the aerosol-generating system optionally comprises a cartridge and a mouthpiece couplable to the cartridge. The cartridge optionally comprises at least one of the reservoir and the aerosol-generating element. Additionally, or alternatively, the housing of the aerosol-generating system optionally further comprises an air inlet, an air outlet, and an airflow path extending therebetween, wherein the vapour optionally at least partially condenses into an aerosol within the airflow path.

For example, in various configurations provided herein, the cartridge may comprise a housing having a connection end and a mouth end remote from the connection end, the connection end configured to connect to a control body of an aerosol-generating system. The aerosol-generating element may be located fully within the cartridge, or located fully within the control body, or may be partially located within the cartridge and partially located within the control body. Electrical power may be delivered to the aerosol-generating element from the connected control body through the connection end of the housing. In some configurations, the aerosol-generating element optionally is closer to the connection end than to the mouth end opening. This allows for a simple and short electrical connection path between a power source in the control body and the aerosol-generating element.

The aerosol-generating element, which optionally is or includes a heating element, may be substantially planar. The heating element may comprise a resistive material, e.g., a material that generates heat responsive to flow of electrical current therethrough. In one configuration, the heating element comprises one or a plurality of electrically conductive filaments. The term ‘filament’ refers to an electrical path arranged between two electrical contacts. The heating element may be or include an array of filaments or wires, for example arranged parallel to each other. In some configurations, the filaments or wires may form a mesh. However, it should be appreciated that any suitable configuration and material of the heating element can be used.

For example, the heating element may include or be formed from any material with suitable electrical properties. Suitable materials include but are not limited to: semiconductors such as doped ceramics, electrically ‘conductive’ ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group. Examples of suitable metal alloys include stainless steel, constantan, nickel-, cobalt-, chromium-, aluminum-, titanium-, zirconium-, hafnium-, niobium-, molybdenum-, tantalum-, tungsten-, tin-, gallium-, manganese- and iron-containing alloys, and super-alloys based on nickel, iron, cobalt, stainless steel, Timetal®, iron-aluminum based alloys and iron-manganese-aluminum based alloys. Timetal® is a registered trade mark of Titanium Metals Corporation. Exemplary materials are stainless steel and graphite, more preferably 300 series stainless steel like AISI 304, 316, 304L, 316L. Additionally, the heating element may comprise combinations of the above materials. In one nonlimiting configuration, the heating element includes or is made of wire. More preferably, the wire is made of metal, most preferably made of stainless steel.

The heater assembly further may comprise electrical contact portions electrically connected to the heating element. The electrical contact portions may be or include two electrically conductive contact pads. In configurations including a housing, the contact portions may exposed through a connection end of the housing to allow for contact with electrical contact pins in a control body.

The reservoir may comprise a reservoir housing. The aerosol-generating element, a heating assembly comprising the aerosol-generating element, or any suitable component thereof may be fixed to the reservoir housing. The reservoir housing may comprise a moulded component or mount, the moulded component or mount being moulded over the aerosol-generating element or the heating assembly. The moulded component or mount may cover all or a portion of the aerosol-generating element or heating assembly and may partially or fully isolate electrical contact portions from one or both of the airflow path and the aerosol-forming substrate.

The moulded component or mount may comprise at least one wall forming part of the reservoir housing. The moulded component or mount may define a flow path from the reservoir to the aerosol-generating element.

The housing may be formed form a mouldable plastics material, such as polypropylene (PP) or polyethylene terephthalate (PET). The housing may form a part or all of a wall of the reservoir. The housing and reservoir may be integrally formed. Alternatively the reservoir may be formed separately from the housing and assembled to the housing.

In configurations in which the aerosol-generating system or device includes a cartridge, the cartridge may comprise a removable mouthpiece through which aerosol may be drawn by a user. The removable mouthpiece may cover the mouth end opening. Alternatively the cartridge may be configured to allow a user to draw directly on the mouth end opening.

The cartridge may be refillable with liquid or gel aerosol-forming substrate. Alternatively, the cartridge may be designed to be disposed of when the reservoir becomes empty of liquid or gel aerosol-forming substrate.

In configurations in which the aerosol-generating system or device further includes a control body, the control body may comprise at least one electrical contact element configured to provide an electrical connection to the aerosol-generating element when the control body is connected to the cartridge. The electrical contact element optionally may be elongate. The electrical contact element optionally may be spring-loaded. The electrical contact element optionally may contact an electrical contact pad in the cartridge. Optionally, the control body may comprise a connecting portion for engagement with the connection end of the cartridge. Optionally, the control body may comprise a power supply. Optionally, the control body may comprise control circuitry configured to control a supply of power from the power supply to the aerosol-generating element.

The control circuitry optionally may comprise a microcontroller. The microcontroller is preferably a programmable microcontroller. The control circuitry may comprise further electronic components. The control circuitry may be configured to actuate the present haptic output element. The aerosol-generating device or system may comprise a pressure sensor configured to generate a time-dependent airflow signal corresponding to a time dependent strength of a user puff at the air outlet, and the control circuitry may be configured to receive the time-dependent airflow signal and to actuate the haptic output element in a time-dependent manner based on such signal. The control circuitry further may be configured to regulate a supply of power to the aerosol-generating element. Power may be supplied to the aerosol-generating element continuously following activation of the system or may be supplied intermittently, such as on a puff-by-puff basis. The power may be supplied to the aerosol-generating element in the form of pulses of electrical current.

The control body may comprise a power supply arranged to supply power to at least one of the control system, the haptic output element, the sensor, and the aerosol-generating element. The aerosol-generating element may comprise an independent power supply. The aerosol-generating system or device may comprise a first power supply arranged to supply power to the control circuitry, a second power supply configured to supply power to the aerosol-generating element, and a third power supply configured to supply power to the haptic output element and to the sensor, or may comprise fewer power supplies that respectively are configured to supply power to any suitable combination of the control circuitry, the aerosol-generating element, the haptic output element, and the sensor.

Each such power supply may be or include a DC power supply. The power supply may be or include a battery. The battery may be or include a lithium based battery, for example a lithium-cobalt, a lithium-iron-phosphate, a lithium titanate or a lithium-polymer battery. The battery may be or include a nickel-metal hydride battery or a nickel cadmium battery. The power supply may be or include another form of charge storage device such as a capacitor. Optionally, the power supply may require recharging and be configured for many cycles of charge and discharge. The power supply may have a capacity that allows for the storage of enough energy for one or more user experiences; for example, the power supply may have sufficient capacity to allow for the continuous generation of aerosol for a period of around six minutes, corresponding to the typical time taken to smoke a conventional cigarette, or for a period that is a multiple of six minutes. In another example, the power supply may have sufficient capacity to allow for a predetermined number of puffs or discrete activations of the heating assembly. Preferably, the power supply further may have sufficient capacity to allow for any suitable number of actuations of the haptic output elements.

The aerosol-generating system or device may be or include a handheld aerosol-generating system. The handheld aerosol-generating system may be configured to allow a user to puff on a mouthpiece to draw an aerosol through the mouth end opening. The aerosol-generating system may have a size comparable to a conventional cigar or cigarette. The aerosol-generating system optionally may have a total length between about 30 mm and about 150 mm. The aerosol-generating system may have an external diameter between about 5 mm and about 30 mm.

Optionally, the housing may be elongate. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. The material may be light and non-brittle. The haptic output element and sensor respectively can be coupled to any suitable portion of the housing. For example, the haptic output element can be coupled to the cartridge or to the control body. Independently, the sensor can be coupled to the cartridge or to the control body.

Additionally, or alternatively, the cartridge, control body or aerosol-generating system may comprise a temperature sensor in communication with the control circuitry. The cartridge, control body or aerosol-generating system or device may comprise a user input, such as a switch or button. The user input may enable a user to turn the system on and off. Additionally, or alternatively, the cartridge, control body or aerosol-generating system or device optionally may comprise indication means for indicating the determined amount of aerosol-forming substrate held in the reservoir to a user. The control circuitry may be configured to activate the indication means after a determination of the amount of aerosol-forming substrate held in the reservoir has been made. The indication means optionally may comprise one or more of lights, such as light emitting diodes (LEDs), a display, such as an LCD display and audible indication means, such as a loudspeaker or buzzer and vibrating means. The control circuitry may be configured to light one or more of the lights, display an amount on the display, emit sounds via the loudspeaker or buzzer and vibrate the vibrating means.

The aerosol-forming substrate can have any suitable composition. For example, the aerosol-forming substrate may comprise nicotine. The nicotine containing aerosol-forming substrate may be or include a nicotine salt matrix. The aerosol-forming substrate may comprise plant-based material. The aerosol-forming substrate may comprise tobacco. The aerosol-forming substrate may comprise a tobacco-containing material containing volatile tobacco flavour compounds, which are released from the aerosol-forming substrate upon heating. The aerosol-forming substrate may comprise homogenised tobacco material. The aerosol-forming substrate may comprise a non-tobacco-containing material. The aerosol-forming substrate may comprise homogenised plant-based material.

The aerosol-forming substrate may comprise one or more aerosol-formers. An aerosol-former is any suitable known compound or mixture of compounds that, in use, facilitates formation of a dense and stable aerosol and that is substantially resistant to thermal degradation at the temperature of operation of the system. Examples of suitable aerosol formers include glycerine and propylene glycol. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. The aerosol-forming substrate may comprise water, solvents, ethanol, plant extracts and natural or artificial flavours. The aerosol-forming substrate may comprise nicotine and at least one aerosol former. The aerosol former may be glycerine or propylene glycol. The aerosol former may comprise both glycerine and propylene glycol. The aerosol-forming substrate may have a nicotine concentration of between about 0.5% and about 10%, for example about 2%.

It should be appreciated that the present haptic output element is not limited to use with aerosol-generating systems or devices configured for use with liquid or gel aerosol-forming substrates. For example, in other configurations the present haptic output element can be used with or included in aerosol-generating systems or devices that are configured for use with a solid aerosol-forming substrate. One type of aerosol-generating element that can be used with a solid-aerosol forming substrate includes a heater configured to be inserted into a solid aerosol-forming substrate, such as a plug of tobacco.

In some configurations, the heater is substantially blade-shaped for insertion into the aerosol-forming substrate and optionally has a length of between 10 mm and 60 mm, a width of between 2 mm and 10 mm, and a thickness of between 0.2 mm and 1 mm. A preferred length may be between 15 mm and 50 mm, for example between 18 mm and 30 mm. A preferred length may be about 19 mm or about 20 mm. A preferred width may be between 3 mm and 7 mm, for example between 4 mm and 6 mm. A preferred width may be about 5 mm. A preferred thickness may be between 0.25 mm and 0.5 mm. A preferred thickness may be about 0.4 mm. The heater can include an electrically-insulating heater substrate and an electrically-resistive heating element supported by the heater substrate. A through-hole optionally may be defined through the thickness of the heater. The heater mount may provide structural support to the heater and may allow the heater to be located within the aerosol-generating device. The heater mount optionally may be formed from a mouldable material that is moulded around a portion of the heater and may extend through the though-hole to couple to the heater to the heater mount. The heater optionally may have a tapered or pointed end to facilitate insertion into an aerosol-forming substrate.

The heater mount is preferably moulded to a portion of the heater that does not significantly increase in temperature during operation. Such a portion may be termed a holding portion and the heating element may have lower resistivity at this portion so that it does not heat up to a significant degree on the passage of an operational current. The through-hole may be located in the holding portion. The through-hole, if provided, may be formed in the heater before or after the electrically-resistive heating element is formed on the heater substrate. A device may be formed by fixing or coupling a heating assembly to, or within, a housing. The through-hole may be formed by machining, for example by laser machining or by drilling.

The heater mount may provide structural support to the heater and allows it to be securely fixed within an aerosol-generating device. The use of a mouldable material such as a mouldable polymer allows the heater mount to be moulded around the heater and thereby firmly hold the heater. It also allows the heater mount to be produced with a desired external shape and dimensions in an inexpensive manner.

Advantageously, the heating element may be formed from different materials. A first part, or heating part, of the heating element (i.e. that portion supported by the insertion or heating portion of the heater) may be formed from a first material and a holding part of the heating element (i.e. that part supported by a holding portion of the heater) may be formed from a second material, wherein the first material has a greater electrical resistivity coefficient than the second material. For example, the first material may be Ni—Cr (Nickel-Chromium), platinum, tungsten or alloy wire and the second material may be gold or silver or copper. The dimensions of the first and second parts of the heating element may also differ to provide for a lower electrical resistance per unit length in the second portion.

The heater substrate is formed from an electrically insulating material and may be a ceramic material such as Zirconia or Alumina. The heater substrate may provide a mechanically stable support for the heating element over a wide range of temperatures and may provide a rigid structure suitable for insertion into an aerosol-forming substrate. The heater substrate comprises a planar surface on which the heating element is positioned and may comprise a tapered end configured to allow for insertion into an aerosol-forming substrate. The heater substrate advantageously has a thermal conductivity of less than or equal to 2 Watts per metre Kelvin.

The aerosol-generating device preferably comprises a housing defining a cavity surrounding an insertion portion of the heater. The cavity is configured to receive an aerosol-forming article containing an aerosol-forming substrate. The heater mount may form a surface closing one end of the cavity.

In some configurations, the device is preferably a portable or handheld device that is comfortable to hold between the fingers of a single hand.

The power supply of the device may be any suitable power supply, for example a DC voltage source such as a battery. In one embodiment, the power supply is a Lithium-ion battery. Alternatively, the power supply may be a Nickel-metal hydride battery, a Nickel cadmium battery, or a Lithium based battery, for example a Lithium-Cobalt, a Lithium-Iron-Phosphate, Lithium Titanate or a Lithium-Polymer battery.

The device preferably comprises a control element. The control element may be a simple switch. Alternatively the control element may be electric circuitry and may comprise one or more microprocessors or microcontrollers, which may be configured to control the heater as well as control the haptic output element and receive a time dependent airflow signal from a sensor located at any suitable location within the device.

The disclosure provides an aerosol-generating system comprising an aerosol-generating device as described above and one or more aerosol-forming articles configured to be received in a cavity of the aerosol-generating device.

During a usage session, an aerosol-generating article containing the aerosol-forming substrate may be partially contained within the aerosol-generating device. The aerosol-generating article may be substantially cylindrical in shape. The aerosol-generating article may be substantially elongate. The aerosol-generating article may have a length and a circumference substantially perpendicular to the length. The aerosol-forming substrate may be substantially cylindrical in shape. The aerosol-forming substrate may be substantially elongate. The aerosol-forming substrate may also have a length and a circumference substantially perpendicular to the length. The aerosol-generating article may have a total length between approximately 30 mm and approximately 100 mm. The aerosol-generating article may have an external diameter between approximately 5 mm and approximately 12 mm.

The solid aerosol-forming substrate may comprise a tobacco-containing material containing volatile tobacco flavour compounds which are released from the substrate upon heating. Alternatively, the solid aerosol-forming substrate may comprise a non-tobacco material. The solid aerosol-forming substrate may further comprise an aerosol former that facilitates the formation of a dense and stable aerosol. Examples of suitable aerosol formers are glycerine and propylene glycol.

The solid aerosol-forming substrate may comprise, for example, one or more of: powder, granules, pellets, shreds, spaghettis, strips or sheets containing one or more of: herb leaf, tobacco leaf, fragments of tobacco ribs, reconstituted tobacco, homogenised tobacco, extruded tobacco, cast leaf tobacco and expanded tobacco. The solid aerosol-forming substrate may be in loose form, or may be provided in a suitable container or cartridge. Optionally, the solid aerosol-forming substrate may contain additional tobacco or non-tobacco volatile flavour compounds, to be released upon heating of the substrate. The solid aerosol-forming substrate may also contain capsules that, for example, include the additional tobacco or non-tobacco volatile flavour compounds and such capsules may melt during heating of the solid aerosol-forming substrate.

As used herein, homogenised tobacco refers to material formed by agglomerating particulate tobacco. Homogenised tobacco may be in the form of a sheet. Homogenised tobacco material may have an aerosol-former content of greater than 5% on a dry weight basis. Homogenised tobacco material may alternatively have an aerosol former content of between 5% and 30% by weight on a dry weight basis. Sheets of homogenised tobacco material may be formed by agglomerating particulate tobacco obtained by grinding or otherwise combining one or both of tobacco leaf lamina and tobacco leaf stems. Alternatively, or in addition, sheets of homogenised tobacco material may comprise one or more of tobacco dust, tobacco fines and other particulate tobacco by-products formed during, for example, the treating, handling and shipping of tobacco. Sheets of homogenised tobacco material may comprise one or more intrinsic binders, that is tobacco endogenous binders, one or more extrinsic binders, that is tobacco exogenous binders, or a combination thereof to help agglomerate the particulate tobacco; alternatively, or in addition, sheets of homogenised tobacco material may comprise other additives including, but not limited to, tobacco and non-tobacco fibres, aerosol-formers, humectants, plasticisers, flavourants, fillers, aqueous and non-aqueous solvents and combinations thereof.

Optionally, the solid aerosol-forming substrate may be provided on or embedded in a thermally stable carrier. The carrier may take the form of powder, granules, pellets, shreds, spaghettis, strips or sheets. Alternatively, the carrier may be a tubular carrier having a thin layer of the solid substrate deposited on its inner surface, or on its outer surface, or on both its inner and outer surfaces. Such a tubular carrier may be formed of, for example, a paper, or paper like material, a non-woven carbon fibre mat, a low mass open mesh metallic screen, or a perforated metallic foil or any other thermally stable polymer matrix.

In some configurations, the aerosol-forming substrate comprises a gathered crimpled sheet of homogenised tobacco material. As used herein, the term 'crimped sheet' denotes a sheet having a plurality of substantially parallel ridges or corrugations. Preferably, when the aerosol-generating article has been assembled, the substantially parallel ridges or corrugations extend along or parallel to the longitudinal axis of the aerosol-generating article. This advantageously facilitates gathering of the crimped sheet of homogenised tobacco material to form the aerosol-forming substrate. However, it will be appreciated that crimped sheets of homogenised tobacco material for inclusion in the aerosol-generating article may alternatively or in addition have a plurality of substantially parallel ridges or corrugations that are disposed at an acute or obtuse angle to the longitudinal axis of the aerosol-generating article when the aerosol-generating article has been assembled. In certain embodiments, the aerosol-forming substrate may comprise a gathered sheet of homogenised tobacco material that is substantially evenly textured over substantially its entire surface. For example, the aerosol-forming substrate may comprise a gathered crimped sheet of homogenised tobacco material comprising a plurality of substantially parallel ridges or corrugations that are substantially evenly spaced-apart across the width of the sheet.

The solid aerosol-forming substrate may be deposited on the surface of the carrier in the form of, for example, a sheet, foam, gel or slurry. The solid aerosol-forming substrate may be deposited on the entire surface of the carrier, or alternatively, may be deposited in a pattern in order to provide a non-uniform flavour delivery during use.

It should be appreciated that although certain configurations described herein include aerosol-generating elements that generate aerosols via resistive heating, any suitable aerosol-generating element can be used, for example an inductive heating arrangement.

In a second embodiment of the invention, there is provided a method for generating an output in an aerosol-generating device. The aerosol-generating system comprises a housing comprising an air inlet, an air outlet, and an airflow passage extending therebetween, and an aerosol-generating element disposed within the housing and configured to generate an aerosol within the airflow passage. The method includes generating a time dependent airflow signal corresponding to a time dependent strength of a user puff at the air outlet. The method includes actuating, based on the time dependent airflow signal, a haptic output element at time dependent frequencies or at time dependent intervals during the user puff.

Features of the aerosol-generating system of the first embodiment of the invention may be applied to the second embodiment of the invention.

Configurations of the invention will now be described in detail, by way of example only, with reference to the accompanying drawings, in which.

Configurations provided herein relate to an improved interface for an aerosol-generating system. The interface preferably includes a haptic output element configured to convey information to a user via the user's sense of touch. Information about the time dependent strength of a user's puff can be conveyed to the user by actuating the haptic output element at time varying frequencies, at time varying intervals, or at time varying frequencies and time varying intervals during that puff.

Figure 1:
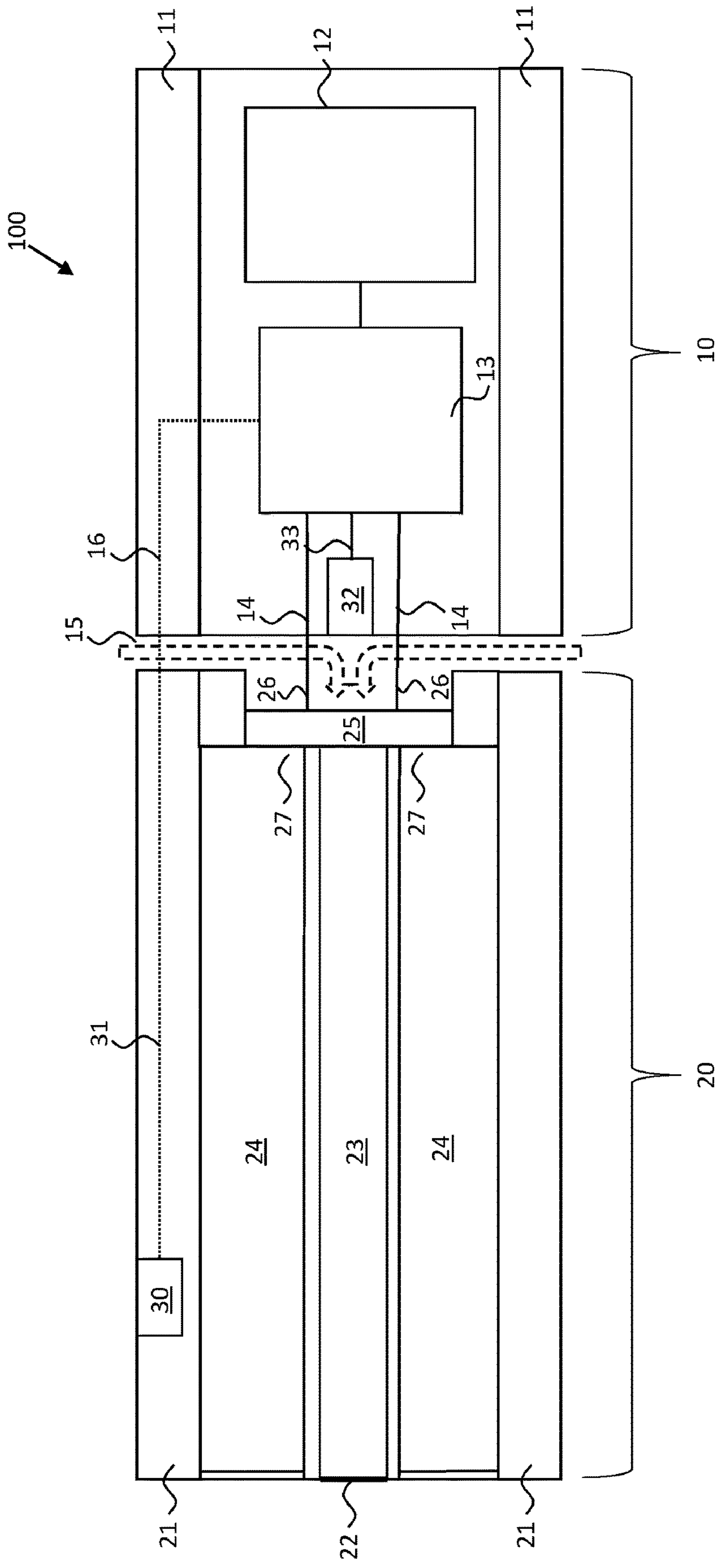
FIG. 1 is a schematic illustration of a cross-section of an aerosol-generating system including a haptic output element in accordance with the invention.

The present haptic output element may be used in any suitable device within an aerosol-generating system, such as in an aerosol-generating device. For example, FIG. 1 is a schematic illustration of an aerosol-generating system 100 including haptic output element 30 in accordance with the invention. The system 100 comprises a cartridge 20 containing a liquid or gel aerosol-forming substrate, and a control body 10. A connection end of the cartridge 20 is removably connected to a corresponding connection end of the control body 10.

The control body 10 includes housing 11, disposed within which is a battery 12, which in one example is a rechargeable lithium ion battery and control circuitry 13.

At least the cartridge 20 and control body 10 of system 100 are portable. For example, when coupled to one another, the cartridge 20 and control body 10 of system 100 can have a size comparable to a conventional cigar or cigarette. For example, when coupled to one another, the cartridge 20 and control body 10 of system 100 preferably are sized and shaped so as to be handheld, and preferably sized and shaped so as to be holdable in one hand, e.g., between a user's fingers.

The cartridge 20 comprises a housing 21 containing a heating assembly 25 and a reservoir 24. A liquid or gel aerosol-forming substrate is held in the reservoir 24. The upper portion of reservoir 24 is connected to the lower portion of the reservoir 24 illustrated in FIG. 1. The heating assembly 25 receives substrate from reservoir 24 and heats the substrate to generate a vapour, e.g., includes a resistive heating element coupled to controller 13 via electrical interconnects 26, 14 so as to receive power from battery 12. One side of heating assembly 25 is in fluidic communication with reservoir 24 (for example, via fluidic channels 27) so as to receive the aerosol-forming substrate from reservoir 24, e.g., by capillary action. The heating assembly 25 is configured to heat the aerosol-forming substrate to generate a vapour.

In the illustrated configuration, an air flow path 23 extends through the cartridge 20 from air inlet 15 (optionally which may be between control body 10 and cartridge 20), past the heating assembly 25, and through a path 23 through reservoir 24 to a mouth end opening (air outlet) 22 in the cartridge housing 21. The system 100 is configured so that a user can puff on the mouth end opening 22 of the cartridge 20 to draw aerosol into their mouth. In operation, when a user puffs on the mouth end opening 22, air is drawn into and through the airflow path 23 from the air inlet 15 and past the heating assembly 25 as illustrated in dashed arrows in FIG. 1, and to the mouth end opening (air outlet) 22. The control circuitry 13 controls the supply of electrical power from the battery 12 to the cartridge 20 via electrical interconnects 14 (in control body 10) coupled to electrical interconnects 26 (in cartridge 20) when the system is activated. This in turn controls the amount and properties of the vapour produced by the heating assembly 25. The control circuitry 13 may supply electrical power to the heating assembly 25 when the user puffs on the cartridge 20 as detected by sensor 32. This type of control arrangement is well established in aerosol-generating systems such as inhalers and e-cigarettes. When a user puffs on the mouth end opening 22 of the cartridge 20, the heating assembly 25 is activated and generates a vapour that is entrained in the air flow passing through the air flow path 29. Optionally, the vapour at least partially cools within the airflow path 23 to form an aerosol within the airflow path, which is then drawn into the user's mouth through the mouth end opening 22. In some configurations, the vapour at least partially cools within the user's mouth to form an aerosol within the user's mouth.

Haptic output element 30 can be coupled to cartridge 20 (such as illustrated) or can be coupled to control body 10. Haptic output element can be coupled to control circuitry 13 via electrical interconnect 31. Sensor 32 can be coupled to cartridge 20 or can be coupled to control body 10 (such as illustrated). Sensor 32 can be coupled to control circuitry 13 via electrical interconnect 33. The control circuitry 13 can be configured so as to receive a time dependent airflow signal from sensor 32 that corresponds to a time dependent strength of a user puff at air outlet 22 of cartridge 20, and to actuate haptic output element 30 based on the time dependent airflow signal. For example, control circuitry 13 can be configured to actuate, based on the time dependent airflow signal, haptic output element 30 at time dependent frequencies or at time dependent intervals during the user puff.

Haptic output element 30 is configured to provide information to a user via the user's sense of touch. In some configurations, haptic output element 30 is selected from the group consisting of a mechanical actuator, a piezoelectric actuator, an electrical actuator, or a thermal output element. An exemplary mechanical actuator is a vibrational actuator. Examples of vibrational actuators that suitably can be included in haptic output element 30 include, but are not limited to, eccentric rotary mass actuators and linear resonant actuators. An example of an eccentric rotary mass actuator is a brushless eccentric rotating mass actuator. Examples of piezoelectric actuators that suitably can be included in haptic output element 30 include, but are not limited to, piezoelectric disks, piezoelectric benders, piezoelectric resonant elements, and electrovibration elements. Examples of thermal output elements that suitably can be included in haptic output element 30 include, but are not limited to, resistive heaters and thermoelectric elements (such as Peltier elements). It should be appreciated that haptic output elements 30 may be located at any suitable portion of aerosol-generating system 100. For example, haptic output element(s) 30 can be located at any suitable location of control body 10 or cartridge 20, e.g., can be coupled to any suitable portion of housing 11 or housing 21 so as to be sensed by the user at any suitable outer portion of cartridge 20 or control body 10, or any other suitable portion of system 100 that may be touched by the user, for example by the user's lip, finger, or palm during use.

Figure 2:
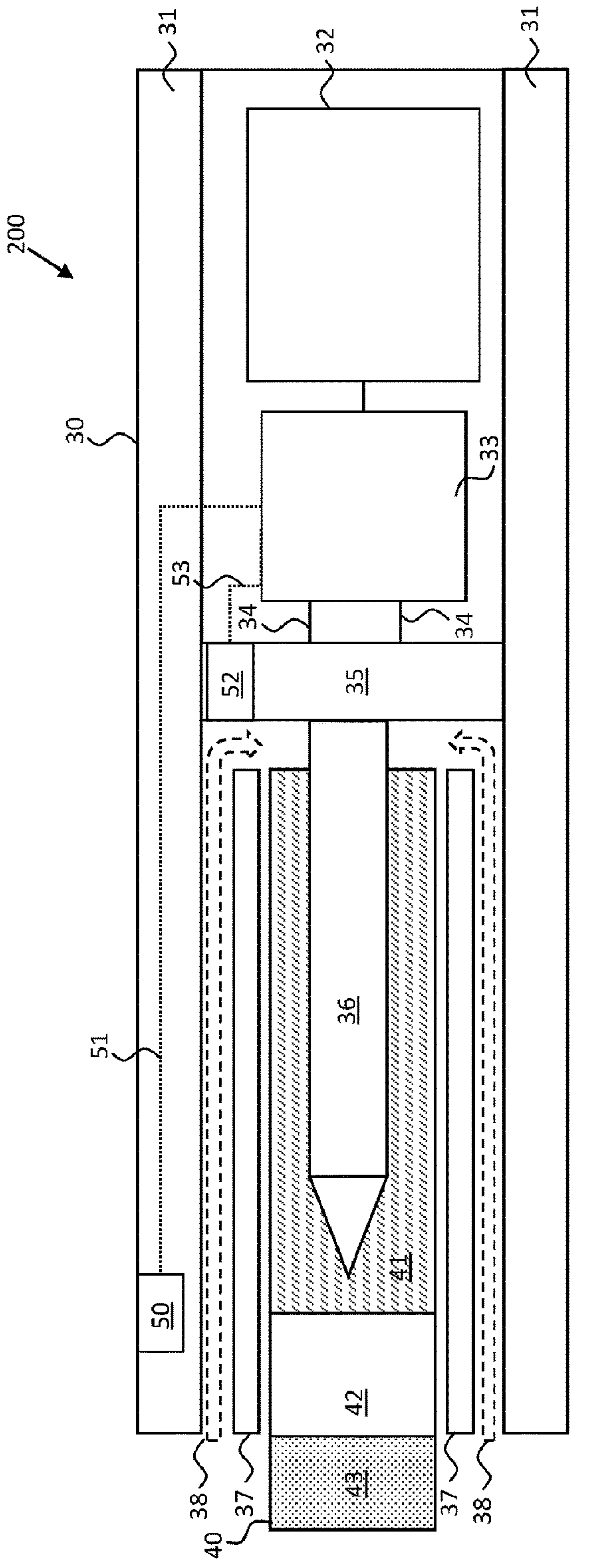
FIG. 2 is a schematic illustration of a cross-section of another aerosol-generating system including a haptic output element in accordance with the invention.

FIG. 2 is a schematic illustration of an alternative aerosol-generating system 200 including haptic output element 50 which respectively can be configured similarly as haptic output element 30 described with reference to FIG. 1, and sensor 52 which can be configured similarly as sensor 32 described with reference to FIG. 1.

The system 200 comprises an aerosol-generating device 30 having a housing 31, and an aerosol-forming article 40, for example a tobacco stick. The aerosol-forming article 40 includes an aerosol-forming substrate 41 that is pushed inside the housing 31 to come into thermal proximity with a portion of a heater 36. Responsive to heating by heater 36, the aerosol-forming substrate 41 will release a range of volatile compounds at different temperatures.

Within the housing 31 there is an electrical energy supply 32, for example a rechargeable lithium ion battery. A controller (control circuitry) 33 is connected to the heater 36 via electrical interconnect 34, to the electrical energy supply 32, to haptic output element 50 via electrical interconnect 51, and to sensor 52 via electrical interconnect 53. The controller 33 controls the power supplied to the heater 36 in order to regulate its temperature, and actuates haptic output element 50 with a time dependent frequency or a time dependent intensity, or both a time dependent frequency and a time dependent intensity, based on the time dependent airflow signal from sensor 52 in a manner such as described elsewhere herein. Typically the aerosol-forming substrate is heated to a temperature of between 250 and 450 degrees centigrade.

The housing 31 of aerosol-generating device defines a cavity, open at the proximal end (or mouth end), for receiving an aerosol-generating article 40 for consumption. Optionally, system 200 includes element(s) 37 disposed within the cavity which, together with housing 31, form(s) air inlet channels 38. The distal end of the cavity is spanned by a heating assembly comprising heater 36 and a heater mount 35. The heater 36 is retained by the heater mount 35 such that an active heating area (heating portion) of the heater 36 is located within the cavity. In one example, the heater 36 includes a through hole (not specifically illustrated) through which material of heater mount 35 extends so as to further secure heater 36 in place. The active heating area of the heater 36 is positioned within a distal end of the aerosol-generating article 40 when the aerosol-generating article 40 is fully received within the cavity. The heater mount 35 optionally may be formed from polyether ether ketone and may be moulded around a holding portion of the heater. The heater 36 optionally is shaped in the form of a blade terminating in a point. That is, the heater 36 optionally has a length dimension that is greater than its width dimension, which is greater than its thickness dimension. First and second faces of the heater 36 may be defined by the width and length of the heater.

An exemplary aerosol-forming article 40, as illustrated in FIG. 2, can be described as follows. The aerosol-generating article 40 comprises three or more elements: an aerosol-forming substrate 41, an intermediate element 42, and a mouthpiece filter 43. These elements may be arranged sequentially and in coaxial alignment and assembled by a cigarette paper (not specifically illustrated) to form a rod. In one nonlimiting configuration, when assembled, the aerosol-forming article 40 may be 45 millimetres long and have a diameter of 7 millimetres, although it should be appreciated that any other suitable combination of dimensions can be used.

The aerosol-forming substrate 41 optionally comprises a bundle of crimped cast-leaf tobacco wrapped in a filter paper (not shown) to form a plug. The cast-leaf tobacco includes one or more aerosol formers, such as glycerine. The intermediate element 42 may be located immediately adjacent the aerosol-forming substrate 41. The intermediate element 42 may be configured so as to locate the aerosol-forming substrate 41 towards the distal end of the article 40 so that it can be contacted with the heater 36. Additionally, or alternatively, the intermediate element 42 may be configured so as to inhibit or prevent the aerosol-forming substrate 41 from being forced along the article 40 towards the mouthpiece when heater 36 is inserted into the aerosol-forming substrate 41. Additionally, or alternatively, the intermediate element 42 may be configured so as to allow volatile substances released from the aerosol-forming substrate 41 to pass along the article towards the mouthpiece filter 43. The volatile substances may cool within the transfer section to form an aerosol. In one nonlimiting configuration, intermediate element 42 may include or may be formed from a tube of cellulose acetate directly coupled to the aerosol-forming substrate. In one nonlimiting configuration, the tube defines an aperture having a diameter of 3 millimetres. Additionally, or alternatively, intermediate element 42 may include or be formed from a thin-walled tube of 18 millimetres in length directly coupled to the mouthpiece filter 43. In one exemplary configuration, intermediate element 42 includes both such tubes. The mouthpiece filter 43 may be a conventional mouthpiece filter, e.g., formed from cellulose acetate, and having a length of approximately 7.5 millimetres. Elements 41, 42, and 43 optionally are assembled by being tightly wrapped within a cigarette paper (not specifically illustrated), e.g., a standard (conventional) cigarette paper having standard properties or classification. The paper in one specific embodiment is a conventional cigarette paper. The interface between the paper and each of the elements 41, 42, 43 locates the elements and defines the aerosol-forming article 40.

As the aerosol-generating article 40 is pushed into the cavity, the tapered point of the heater 36 engages with the aerosol-forming substrate 41. By applying a force to the aerosol-forming article 40, the heater 36 penetrates into the aerosol-forming substrate 41. When the aerosol-forming article 40 is properly engaged, the heater 36 is inserted into the aerosol-forming substrate 42. When the heater 36 is actuated, the aerosol-forming substrate 41 is warmed and volatile substances are generated or evolved. As a user draws on the mouthpiece filter 43, air is drawn into the aerosol-forming article 40 via air inlet channels 38 and the volatile substances condense to form an inhalable aerosol. This aerosol passes through the mouthpiece filter 43 of the aerosol-forming article 40 and into the user's mouth.

It should be appreciated that in aerosol-generating systems provided herein, of which aerosol-generating system 100 described with reference to FIG. 1 and aerosol-generating system 200 described with reference to FIG. 2 provide nonlimiting examples, the haptic output element can be coupled to any suitable element(s) of such system. For example, in some configurations, haptic output element 30 optionally is coupled to housing 11 or to housing 21 of system 100. Additionally, or alternatively, haptic output element 30 optionally is located sufficiently close to mouth end opening 22 that when the haptic output element is actuated, the user can sense the actuation via his or her lip(s), and optionally cannot sense the actuation via his or her palm or finger(s). For example, haptic output element 30 optionally is coupled to housing 21 at a position at or adjacent to mouth end opening 21. Alternatively, haptic output element 30 optionally is located sufficiently far from mouth end opening 22 that when the haptic output element is actuated, the user can sense the actuation via his or her palm or finger(s), and cannot sense the actuation via his or her lip(s). For example, haptic output element 30 optionally is located along housing 11 or 21 at such a position. In still other configurations, haptic output element 30 optionally is located such that when the haptic output element is actuated, the user can sense the actuation via his or her palm or finger(s) and via his or her lip(s). Haptic output element 50 similarly can be located at any suitable position of system 200, e.g., coupled to any suitable portion of housing 31.

It further should be appreciated that any suitable number of such haptic output elements respectively can be coupled to any suitable portion(s) aerosol-generating system. For example, one haptic output element can be coupled to the housing of the aerosol-generating system. As another example, more than one haptic output element can be coupled to the housing of the aerosol-generating device. In various exemplary configurations, two or more, three or more, four or more, five or more, or even ten or more haptic output elements can be coupled to the housing of the aerosol-generating system.

Figures 3A, 3B, 4A, 4B, 4C:
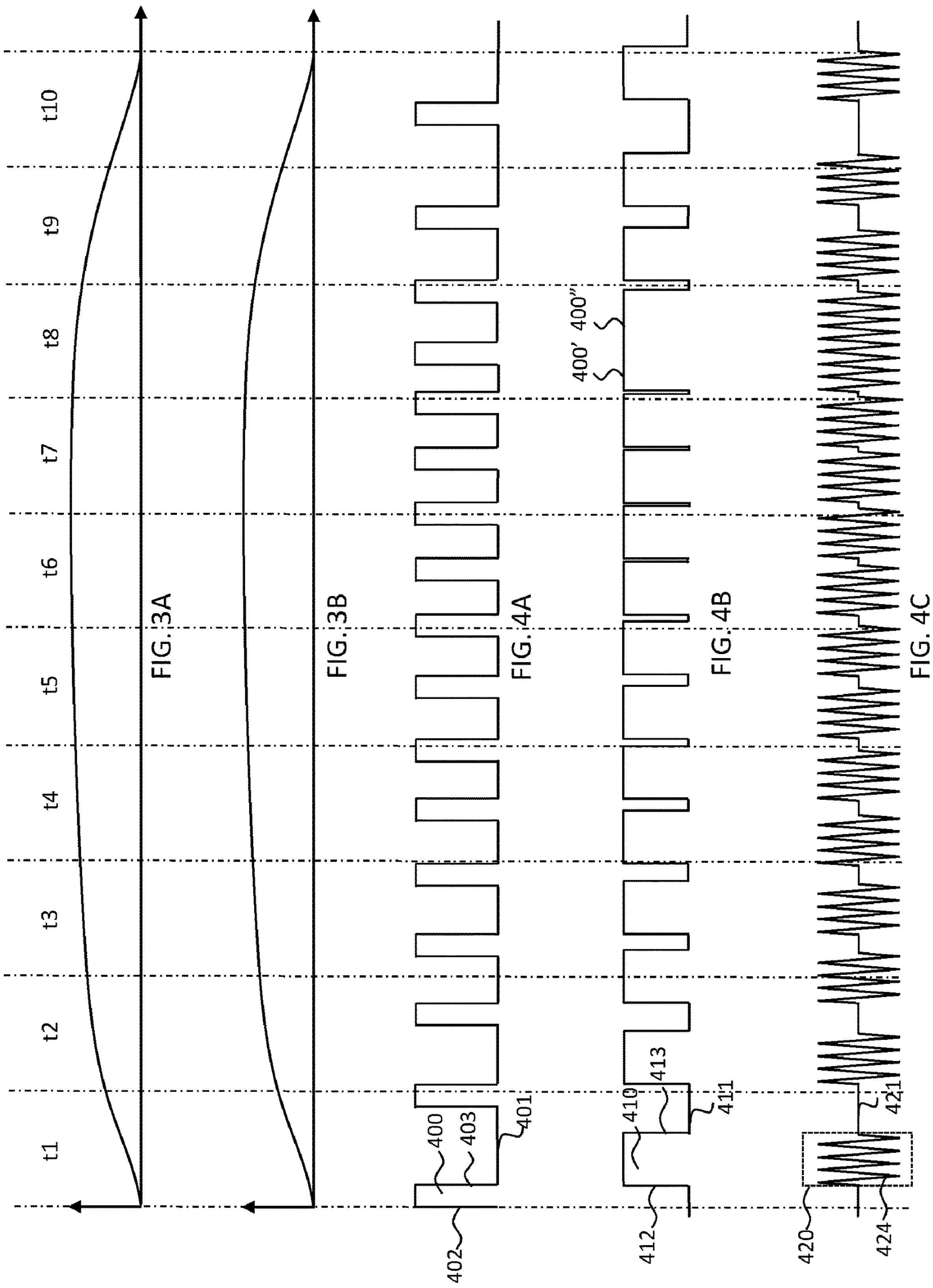
FIG. 3A is a schematic illustration of an exemplary time dependent user puff strength.
FIG. 3B is a schematic illustration of an exemplary time dependent airflow signal corresponding to the time dependent user puff strength illustrated in FIG. 3A.
FIG. 4A is a schematic illustration of an exemplary time dependent actuation signal for a haptic output element based on the time dependent airflow signal illustrated in FIG. 3B.
FIG. 4B is a schematic illustration of an exemplary time dependent output of a haptic output element based on a time dependent actuation signal such as illustrated in FIG. 4A.
FIG. 4C is a schematic illustration of another exemplary time dependent output of a haptic output element based on a time dependent actuation signal such as illustrated in FIG. 4A.

Illustratively, the present aerosol-generating systems can be configured so as to actuate the haptic output element(s) in such a manner as to convey to the user a representation of the strength of the user's puff. For example, FIG. 3A is a schematic illustration of an exemplary time dependent user puff strength at the air outlet of the aerosol-generating system, e.g., at mouth end opening 22 of system 100 or at mouthpiece filter 43 of system 200. During time increment t1 beginning when the user initiates a user puff, the user puff strength changes (e.g., increases) from zero to a first value. During each of subsequent time increments t2, t3, t4, t5, t6, t7, and t8 the user puff strength continues to increase. In the illustrated example, the user puff strength reaches a maximum during time increment t8, following which the user puff strength decreases in each of subsequent time increments t9, t10. During time increment t10, the user puff strength decreases to zero, corresponding to the user terminating the user puff.

Based on the time dependent puff strength of a given puff, the speed of airflow through the aerosol-generating system also may be time dependent. The speed of airflow can be, but need not necessarily be, linearly related to the user puff strength. A sensor provided within the aerosol-generating system can generate a signal corresponding to the speed of airflow within the system, which in turn can correspond to the time dependent strength of the user puff. The circuit optionally is configured to calculate, based on the time dependent airflow signal, a speed of airflow through the airflow passage during the user puff. For example, the circuit optionally is configured to actuate the haptic output element based on the calculated speed of airflow through the airflow passage during the user puff.

Illustratively, sensor 32 of system 100 or sensor 52 of system 200 can be configured so as to generate a time dependent airflow signal corresponding to the time dependent strength of the user puff at the air outlet, of the aerosol-generating system, e.g., at mouth end opening 22 of system 100 or at mouthpiece filter 43 of system 200. As one example, sensor 32 or 52 is or comprises a pressure sensor. FIG. 3B is a schematic illustration of an exemplary time dependent airflow signal corresponding to the time dependent user puff strength illustrated in FIG. 3A. It will be appreciated that the particular time dependent shape and the particular values of the time dependent puff strength and the time dependent airflow signal can vary, and that FIGS. 3A and 3B are intended to be purely illustrative. In the illustrated example, during time increment t1 beginning when the user initiates a user puff, the airflow signal changes (e.g., increases) from zero to a first value. During each of subsequent time increments t2, t3, t4, t5, t6, t7, and t8 the airflow signal continues to increase. In the illustrated example, the airflow signal reaches a maximum during time increment t8 (corresponding to a maximum in the user puff strength), following which the airflow signal decreases in each of subsequent time increments t9, t10. During time increment t10, the airflow signal decreases to zero, corresponding to the user terminating the user puff.

Note that each user puff need not necessarily have the same time dependent puff strength and corresponding airflow signal as one another. For example, the time dependent puff strength and corresponding airflow signal may differ from puff to puff for a given user, e.g., may differ in one or both of the time dependent shape of the puff strength and corresponding airflow signal or the maximum puff strength and corresponding airflow signal. Similarly, the time dependent puff strength and corresponding airflow signal may differ from the time dependent puff strength and corresponding airflow signal for different users. Generally, the time dependent puff strength and corresponding airflow signal may begin at zero, increase to a maximum, and then decrease to zero. The increase to the maximum from zero can be monotonic, or can be non-monotonic. Similarly, the decrease from the maximum to zero can be monotonic, or can be non-monotonic.

The aerosol-generating system may include a circuit operably coupled to the sensor, e.g., a pressure sensor, so as to receive the time-dependent airflow signal during the user puff. For example, control circuitry 13 of system 100 may be operably coupled to sensor 32, or control circuitry 33 of system 200 may be operably coupled to sensor 52, so as respectively to receive the time-dependent airflow signal therefrom. The circuitry further may be operably coupled to a haptic output element and configured to actuate, based on the time dependent airflow signal, the haptic output element at time dependent frequencies or at time dependent intervals during the user puff. For example, the circuitry may be configured so as to generate a time dependent actuation signal for the haptic output element based on the time dependent airflow signal received from the sensor.

FIG. 4A is a schematic illustration of an exemplary time dependent actuation signal for a haptic output element based on the time dependent airflow signal illustrated in FIG. 3B. The time dependent actuation signal illustrated in FIG. 4A may include, or consist of, a sequence of pulses 400, such as square wave voltage pulses, each of which pulses actuates the haptic output element in a predefined manner. For example, each square wave may include a rising edge 402 and a falling edge 403. However, it should be understood that the time dependent actuation signal may have any suitable shape, e.g., may include or consist of a sequence of sine wave pulses, each of which sine wave pulses actuates the haptic output element in a predefined manner in a manner similarly as the square wave pulses 400 described with reference to FIG. 4A. The circuit may generate the pulses 400 of the time dependent actuation signal, based on the time dependent airflow signal, in such a manner as to actuate the haptic output element at time dependent frequencies or at time dependent intervals during the user puff. For example, the circuit may be configured to actuate the haptic output element at shorter intervals or at higher frequencies during the user puff based upon an increase in the time dependent airflow signal. Additionally, or alternatively, the circuit may be configured to actuate the haptic output element at longer intervals or at lower frequencies during the user puff based upon a decrease in the time dependent airflow signal.

In the nonlimiting example illustrated in FIG. 4A, pulses 400 are separated from one another by intervals 401 (e.g., periods of sufficiently low voltage, such as zero voltage, that do not actuate the haptic output element) which may vary in a time dependent manner based on the time dependent airflow signal. For example, the time dependent length of intervals 401 between pulses 400 may be inversely related (e.g., inversely linearly related) to the value of the time dependent airflow signal. As such, increases in the time dependent airflow signal cause decreases in intervals 401, resulting in a shorter time between pulses 400. As a nonlimiting example, as the value of the time dependent airflow signal illustrated in FIG. 3B sequentially increases from t1 to t8, the length of intervals 401 in the time dependent actuation signal correspondingly and sequentially decreases from t1 to t8, resulting in sequentially shorter times between pulses 400 from t1 to t8; analogously, as the value of the time dependent airflow signal illustrated in FIG. 3B sequentially decreases from t8 to t10, the length of intervals 401 in the time dependent actuation signal correspondingly and sequentially increases from t8 to t10, resulting in sequentially longer times between pulses 400 from t8 to t10.

The time dependent actuation signal generated by the circuit may actuate the haptic output element at time dependent frequencies or time dependent intervals during the user puff. For example, FIG. 4B is a schematic illustration of an exemplary time dependent output of a haptic output element based on a time dependent actuation signal such as illustrated in FIG. 4A. In the nonlimiting example illustrated in FIG. 4B, the haptic output element is actuated, based on the time dependent actuation signal, at time dependent intervals during the user puff. For example, responsive to the falling edge 403 of a pulse 400 in the time dependent actuation signal, the haptic output element may be actuated 410 at for a predefined period of time, e.g., in FIG. 4B as represented by rising edge 412 followed by falling edge 413. Actuations 410 are separated from one another by intervals 411 (e.g., periods of non-actuation) which may vary in a time dependent manner based on the time dependent actuation signal, and thus may vary in a time dependent manner based on the time dependent airflow signal.

For example, the time dependent length of intervals 411 between actuations 410 may be directly related (e.g., directly linearly related) to the intervals 401 between pulses of the time dependent actuation signal. As such, increases in the time dependent actuation signal cause increases in intervals 401, resulting in a shorter time between actuations 410. For example, as the length of the intervals 401 of the time dependent actuation signal illustrated in FIG. 4A sequentially decrease from t1 to t8, the length of intervals 411 between actuations of the haptic output element correspondingly and sequentially decrease from t1 to t8, resulting in sequentially shorter times between actuations 410 from t1 to t8; analogously, as the length of the intervals 401 of the time dependent actuation signal illustrated in FIG. 4A sequentially decrease from t8 to t10, the lengths of intervals 411 between actuations 420 correspondingly and sequentially increase from t8 to t10, resulting in sequentially longer times between actuations 410 from t8 to t10. In this example, the intensities of actuations 410 are constant. As such, more intense user puffing can result in shorter time intervals between actuations 410 so as to provide the user with feedback regarding his or her puff strength during a puff without increasing the intensity of the haptic feedback, thus improving the user experience.

Note that in some circumstances, a given actuation of the haptic output element optionally may overlap with a subsequent actuation of the haptic output element. For example, during exemplary interval t8, the haptic output element is actuated in such a manner that first actuation 400' and second actuation 400" overlap with one another, resulting in an extended actuation 400', 400" that is longer than either such actuation individually.

Although FIG. 4B illustrates each actuation 410 of the haptic output element as a square wave, it should be appreciated that each actuation of a given haptic output element can have any suitable time dependent shape. That is, the rising edge 412 and falling edge 413 can have any suitable linear or nonlinear shape. For example, certain types of haptic output elements, such as electrical, mechanical, or piezoelectric actuators configured to convey information to the user by a vibration, a tap, a force, or an electrical signal, may be actuated instantaneously or near-instantaneously responsive to the time dependent actuation signal and may cease actuation instantaneously or near-instantaneously responsive to the time dependent actuation signal, resulting in an actuation 410 that is a square wave. However, the actuation and cessation of actuation of other types of haptic output elements, such as thermal output elements configured to convey information to the user by a temperature change (such as a heat pulse or a cold pulse), may occur more slowly, resulting in an actuation 410 that is not a square wave.

Indeed, any suitable type of haptic output element may be actuated using any suitable time dependent actuation signal. For example, FIG. 4C is a schematic illustration of another exemplary time dependent output of a haptic output element based on a time dependent actuation signal such as illustrated in FIG. 4A. In the example shown in FIG. 4C, the haptic output element comprises a mechanical actuator or a piezoelectric actuator which, when actuated 420 by a pulse 400 of a time dependent actuation signal, generates a predetermined number of vibrational cycles 424. Actuations 420 are separated from one another by intervals 421 (e.g., periods of non-actuation) which may vary in a time dependent manner based on the time dependent actuation signal. For example, the time dependent length of intervals 421 between actuations 420 may be directly related (e.g., directly linearly related) to the intervals 401 between pulses of the time dependent actuation signal. As such, increases in the time dependent actuation signal cause increases in intervals 401, resulting in shorter times between actuations 420. For example, as the length of the intervals 401 of the time dependent actuation signal illustrated in FIG. 4A sequentially decrease from t1 to t8, the length of intervals 421 between actuations of the haptic output element correspondingly and sequentially decrease from t1 to t8, resulting in sequentially shorter times between actuations 420 from t1 to t8; analogously, as the length of the intervals 401 of the time dependent actuation signal illustrated in FIG. 4A sequentially decrease from t8 to t10, the lengths of intervals 421 between actuations 420 correspondingly and sequentially increase from t8 to t10, resulting in sequentially longer times between actuations 420 from t8 to t10. In this example, the intensities of actuations 420 are constant. As such, more intense user puffing can result in shorter time intervals between actuations 420 so as to provide the user with feedback regarding his or her puff strength during a puff without increasing the intensity of the haptic feedback, thus improving the user experience. In one exemplary configuration, the circuitry can be configured to begin actuating the haptic output element responsive to the time dependent airflow signal changing from zero to another value, which can correspond to a pressure drop. Additionally, or alternatively, the circuitry can be configured to change the intervals of actuating the haptic output element responsive to the time dependent airflow signal changing by a certain value, or changing to a certain value, which can correspond to a change in the size fo the pressure drop.

It should be appreciated that time differences between the intervals between pulses 400 of the time dependent actuation signal provide only one example of the manner in actuation of the haptic output element may be varied in a time dependent manner. Other examples include changes in intensity, or in frequency, or in intensity and in frequency. For example, in nonlimiting examples such as described with reference to FIGS. 4A-4C, the intensity of each actuation 410, 420 of the haptic output element optionally may be based upon the intensity of the corresponding pulse 400 of the time dependent actuation signal. For example, in FIG. 4A each pulse 400 has the same or approximately the same intensity as each other pulse 400, and as a result each actuation 410, 420 of the haptic output element has the same or approximately the same as each other actuation 410, 420. However, in other configurations one or more of the pulses in the time dependent actuation signal can have different intensities as one another. Optionally, at least some of the pulse 400 intensities can correspond to values of the time dependent airflow signal. Some or all of the actuations 410, 420 of the haptic output element can have different intensities as one another. Optionally, at least some of the actuation intensities can correspond to values of the time dependent airflow signal.

Figures 5A, 5B, 5C, 5D:
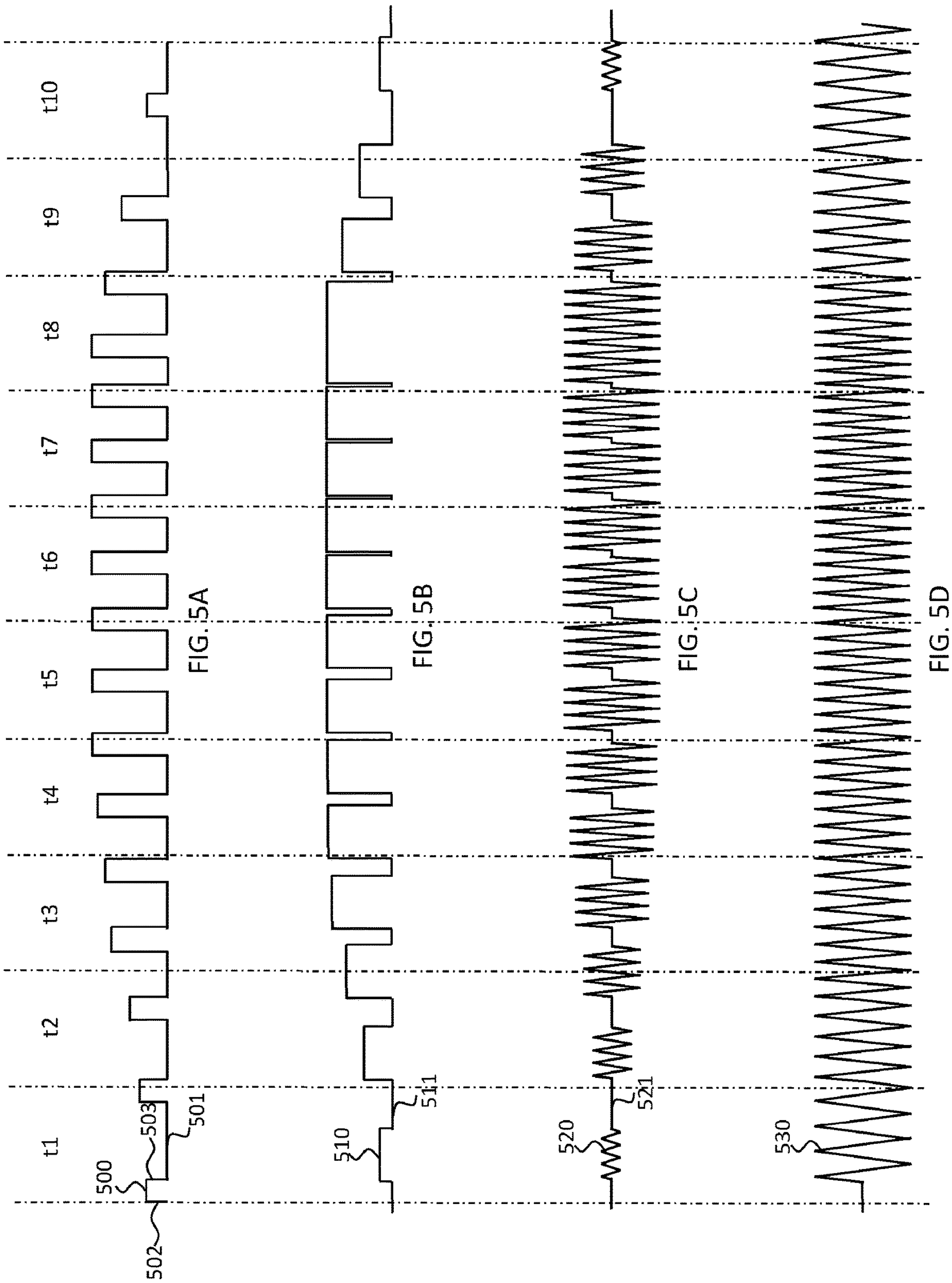
FIG. 5A is a schematic illustration of another exemplary time dependent actuation signal for a haptic output element based on the time dependent airflow signal illustrated in FIG. 3B.
FIGS. 5B-5G are schematic illustrations of various exemplary time dependent outputs of a haptic output element based on a time dependent actuation signal such as illustrated in FIG. 5A.
Figures 5E, 5F, 5G:
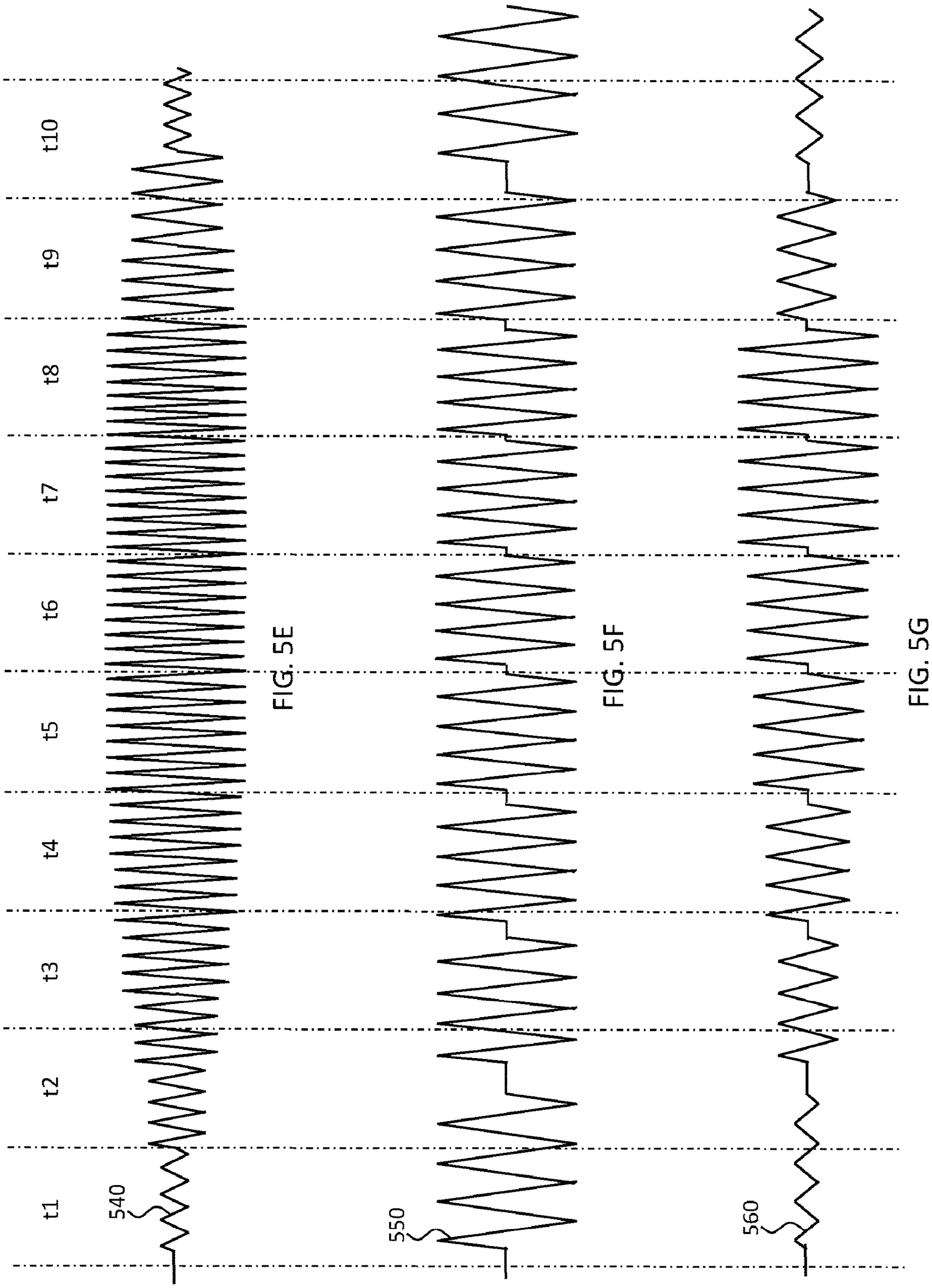

For example, FIG. 5A is a schematic illustration of another exemplary time dependent actuation signal for a haptic output element based on the time dependent airflow signal illustrated in FIG. 3B, and FIGS. 5B-5G are schematic illustrations of various exemplary time dependent outputs of a haptic output element based on a time dependent actuation signal such as illustrated in FIG. 5A. In FIG. 5A, pulses 500 in the time dependent actuation signal are separated from one another by intervals 501 in a manner such as described above with reference to FIG. 4A. Additionally, the respective intensities of pulses 500 can be based on the value of the time dependent airflow signal. Illustratively, the intensities of pulses 500 can vary directly (e.g., directly linearly) with the value of the time dependent airflow signal, such that increases in the time dependent airflow signal cause respective increases in pulses 500.

In some configurations, variations in the intensity of the time dependent actuation signal, e.g., intensities of sequential pulses 500, can cause variations in the intensity of the time dependent actuation of the haptic output element. In the nonlimiting example illustrated in FIG. 5B, the haptic output element is actuated, based on the time dependent actuation signal, at time dependent intervals and at time dependent intensities, during the user puff. For example, actuations 510 can be separated from one another by intervals 511 (e.g., periods of non-actuation) which may vary in a time dependent manner based on time intervals in the time dependent actuation signal in a manner such as described above with reference to FIGS. 4A and 4B. Additionally, or alternatively, actuations 510 can have intensities optionally which may vary in a time dependent manner based upon intensities in the time dependent actuation signal. For example, the intensities of actuations 510 may be directly related (e.g., directly linearly related) to the intensities of corresponding pulses 500 of the time dependent actuation signal. As such, increases in the time dependent actuation signal cause increases in intervals 501, resulting in a shorter time between actuations 510. In FIG. 5B, both the interval 511 and the intensity of subsequent actuations 510 varies based on the respective variations in the interval 501 and the intensity of pulses 500 in the time dependent actuation signal. However, it should be understood that either of such parameters (interval or intensity) of the actuation of the haptic output element may be varied without varying the other of such parameters. In the nonlimiting example illustrated in FIG. 5C, the haptic output element comprises a mechanical actuator or a piezoelectric actuator which, when actuated 520 by a pulse 500 of a time dependent actuation signal, generates a predetermined number of vibrational cycles with an intensity corresponding to the intensity of that pulse 500. The interval 521 and the intensity of subsequent actuations 520 of the haptic output element are based on the intervals 501 and intensities of subsequent pulses 500.

It should be understood that any suitable parameter of the haptic output element may be varied as a function of time based on the time dependent airflow signal, and is not limited to interval and intensity. Furthermore, it should be understood that any such parameter of the actuation of the haptic output element may be varied with or without varying other such parameters. In the nonlimiting example illustrated in FIG. 55, the haptic output element is actuated, based on the time dependent actuation signal, at a time dependent frequency during the user puff. In the example shown in FIG. 5D, the haptic output element comprises a mechanical actuator or a piezoelectric actuator which, when actuated 530 by a pulse 500 of a time dependent actuation signal, generates vibrational cycles at a time dependent frequency. For example, the circuit may be configured to sequentially actuate 530 the haptic output element at frequencies that are based on any suitable combination of one or more of the respective widths, shapes, or intensities of sequential pulses 500 of the time dependent actuation signal. In one exemplary configuration, the circuitry can be configured to begin actuating the haptic output element responsive to the time dependent airflow signal changing from zero to another value, which can correspond to a pressure drop. Additionally, or alternatively, the circuitry can be configured to change any suitable combination of the intensity, frequency, and intervals of actuating the haptic output element responsive to the time dependent airflow signal changing by a certain value, or changing to a certain value, which can correspond to a change in the size of the pressure drop. In FIG. 5D, the frequencies of respective actuations 530 may be directly related (e.g., directly linearly related) to the intensities of pulses 500 of the time dependent actuation signal such as illustrated in FIG. 5A. As such, increases in intensity of pulses 500 in the time dependent actuation signal can cause higher frequency actuations 530. For example, as the intensity of the pulses 500 of the time dependent actuation signal illustrated in FIG. 5A sequentially increase from t1 to t8, the frequency of actuations 530 of the haptic output element correspondingly and sequentially increase from t1 to t8; analogously, as the intensity of the pulses 500 of the time dependent actuation signal illustrated in FIG. 5A sequentially decrease from t8 to t10, the frequency of actuations 530 of the haptic output element correspondingly and sequentially decrease from t8 to t10. In this example, the intensities of actuations 530 are constant. As such, more intense user puffing can result in shorter time intervals between actuations 530 so as to provide the user with feedback regarding his or her puff strength during a puff without increasing the intensity of the haptic feedback, thus improving the user experience.

In still other examples, any suitable combination of parameters of actuation of the haptic output element may be varied. For example, in FIG. 5E, the circuit is configured to actuate 540 the haptic output element at time dependent intensities in a manner such as described with reference to FIGS. 5B-5C and at time dependent frequencies in a manner such as described with reference to FIG. 5D. As another example, in FIG. 5F, the circuit is configured to actuate 550 the haptic output element at time dependent intervals in a manner such as described with reference to FIGS. 4B-4C and at time dependent frequencies in a manner such as described with reference to FIG. 5D. In this example, the intensities of actuations 550 are constant. As such, more intense user puffing can result in shorter time intervals between actuations 550 so as to provide the user with feedback regarding his or her puff strength during a puff without increasing the intensity of the haptic feedback, thus improving the user experience. As yet another example, in FIG. 5G, the circuit is configured to actuate 560 the haptic output element at time dependent intervals in a manner such as described with reference to FIGS. 4B-4C, at time dependent intensities in a manner such as described with reference to FIGS. 5B-5C, and at time dependent frequencies in a manner such as described with reference to FIG. 5D.

In some configurations, the present aerosol-generating systems store multiple different profiles for actuating the haptic output element. For example, control circuitry 13 or 33 can include or can be coupled to suitable computer-readable memory configured to store such profiles. Each such profile can include one or more different values that respectively may specify parameter(s) for actuating the haptic output element 30 or 50. As one example, one or more profiles may specify different intensities, or different maximum intensities, with which the haptic output element may be actuated. As another example, one or more profiles may specify different coefficients between waiting times. Illustratively, the device can be configured so as to determine specific waiting times based on detected puff intensity, which means that the waiting time can be led by multiplying the detected puff intensity by a stored coefficient (such as a coefficient greater than one). A larger coefficient means that the waiting time will be change by a greater amount based on the change of intensity. As another example, one or more profiles may specify different detected puff intensities. Illustratively, the device may store a first profile for a relatively weak puff and a second, different profile for a relatively strong puff. The device may be configured to differentiate the relatively weak puff from the relatively strong puff based on the detected rate of change of puff intensity. Other suitable profiles readily may be envisioned based on the teachings herein.

In some configurations, the present aerosol-generating systems comprise an interface configured to allow the user to select from among different profiles for actuating the haptic output element. For example, the aerosol-generating system 100 or 200 optionally may include a suitable wired or wireless communication interface (not specifically illustrated) with which the system may communicate with another device, such as a smartphone. The system 100 or 200 or the smartphone may include an interface allowing the user to select from among different profiles for actuating the haptic output element. The profiles may be stored in the smartphone or in computer readable memory (not specifically illustrated) of system 100 or 200. In one nonlimiting example, the interface allows the user to set an intensity of actuation for the haptic output element, such as an intensity of vibration for the haptic output element. Illustratively, the interface allows the user to turn on or off the haptic output element.

Additionally, or alternatively, in some configurations the present aerosol-generating systems optionally are configured so as to download different profiles for actuating the haptic output element from a remote server, e.g., via a smartphone. The profiles may be stored in the smartphone or in computer readable memory (not specifically illustrated) of system 100 or 200. The profiles may be stored in the smartphone or in computer readable memory (not specifically illustrated) of system 100 or 200.

Figure 6:
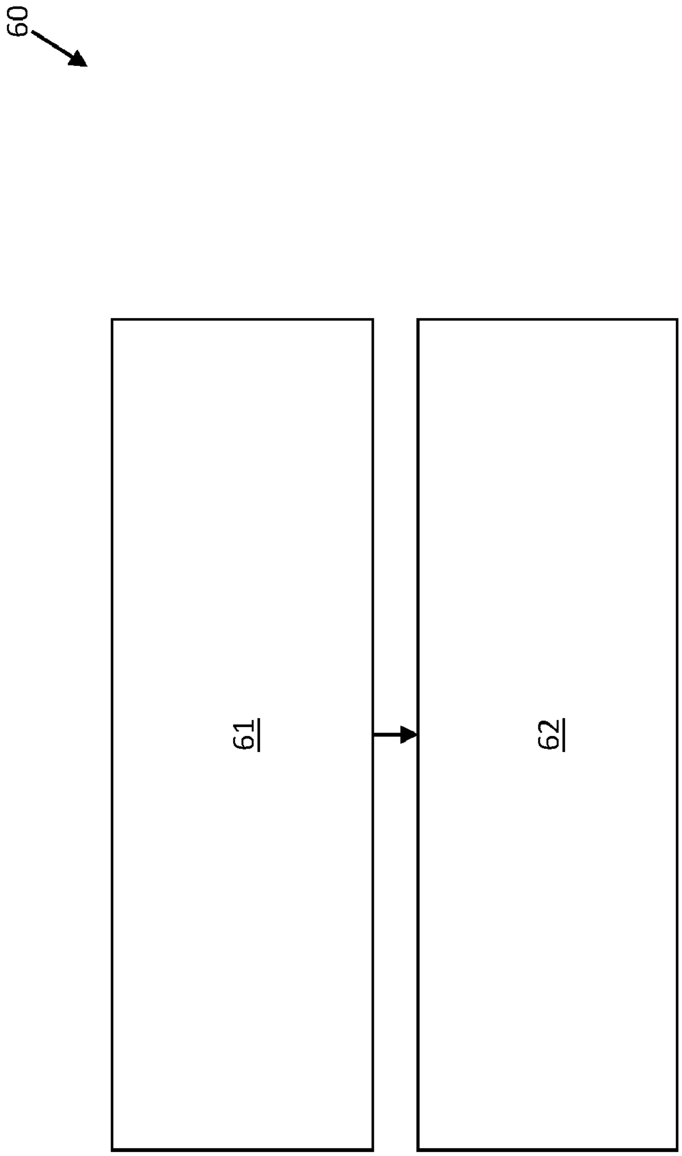
FIG. 6 illustrates a flow of operations in an exemplary method, in accordance with the invention.

FIG. 6 illustrates a flow of operations in an exemplary method 60. Although the operations of method 60 are described with reference to elements of systems 100 and 200, it should be appreciated that the operations can be implemented by any other suitably configured systems.

Method 60 includes generating a time dependent airflow signal corresponding to a time dependent strength of a user puff at an air outlet of an aerosol-generating device (61). The aerosol-generating system may include an aerosol-generating element configured to generate an aerosol using any suitable aerosol-forming substrate, such as a liquid, gel, or solid. The time dependent airflow signal may be generated by a sensor, such as a pressure sensor, provided in any suitable location relative to the air outlet of the aerosol-generating system. Nonlimiting examples of aerosol-generating devices that may include sensors are described herein, for example with reference to FIGS. 1 and 2.

Method 60 illustrated in FIG. 6 includes actuating, based on the time dependent airflow signal, a haptic output element at time dependent frequencies or at time dependent intervals during a user puff (62). For example, in some configurations such as described with reference to FIGS. 1 and 2, the haptic output element may be coupled to control circuitry of the aerosol-generating system via a suitable communication pathway. Any other suitable circuit coupled to the haptic output element can be provided.

Although some configurations of the invention have been described in relation to a system comprising a control body and a separate but connectable cartridge, it should be clear that the elements suitably can be provided in a one-piece aerosol-generating system.

It should also be clear that alternative configurations are possible within the scope of the invention. For example, the present haptic output elements suitably may be integrated into any type of device or system, and are not limited to use in aerosol-generating devices and systems. Illustratively, the present haptic output elements may be included in medical devices, smartphones, or the like.

The invention claimed is:

1. An aerosol-generating device, comprising:

a housing comprising an air inlet, an air outlet, and an airflow passage extending therebetween;

an aerosol-generating element disposed within the airflow passage and configured to generate an aerosol;

a sensor coupled to the housing and configured to generate a time-dependent airflow signal corresponding to a time-dependent strength of a user puff at the air outlet;

a haptic output element coupled to the housing; and a circuit operably coupled to the sensor so as to receive the time-dependent airflow signal during the user puff, the circuit being further operably coupled to the haptic output element and configured to actuate, based on the time-dependent airflow signal, the haptic output element at time-dependent frequencies or at time-dependent intervals during the user puff, the circuit being further configured to:

actuate the haptic output element at shorter intervals or at higher frequencies during the user puff based upon an increase in the time-dependent airflow signal, and/or actuate the haptic output element at longer intervals or at lower frequencies during the user puff based upon a decrease in the time-dependent airflow signal.

2. The aerosol-generating device according to claim 1, wherein the circuit is further configured to actuate the haptic output element at a constant intensity during the user puff.

3. The aerosol-generating device according to claim 1, wherein the circuit is further configured to calculate, based on the time-dependent airflow signal, a speed of airflow through the airflow passage during the user puff.

4. The aerosol-generating device according to claim 3, wherein the circuit is further configured to actuate the haptic output element based on the calculated speed of airflow through the airflow passage during the user puff.

5. The aerosol-generating device according to claim 1, wherein the haptic output element comprises a mechanical actuator or a piezoelectric actuator.

6. The aerosol-generating device according to claim 5, wherein the mechanical actuator comprises a linear resonant actuator or an eccentric rotating mass actuator.

7. The aerosol-generating device according to claim 1, wherein the sensor comprises a pressure sensor.

8. The aerosol-generating device according to claim 1, wherein the haptic output element is located such that a user's lips can sense actuation of the haptic output element.

9. The aerosol-generating device according to claim 1, wherein the haptic output element is located such that one or more of a user's fingers can sense actuation of the haptic output element.

10. The aerosol-generating device according to claim 1, further comprising an interface configured to allow a user to select a haptic feedback profile.

11. The aerosol-generating device according to claim 1, wherein the aerosol-generating element comprises a heater.

12. An aerosol-generating system, comprising an aerosol-generating device according to claim 1; and an aerosol-generating substrate comprising nicotine.

* * * * *